(12) United States Patent
Sekine et al.

(10) Patent No.: US 7,457,542 B2
(45) Date of Patent: Nov. 25, 2008

(54) OPTICAL ACCESS NETWORK SYSTEM

(75) Inventors: Kenro Sekine, Fuchu (JP); Nobuaki Tajimi, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 548 days.

(21) Appl. No.: 11/335,525

(22) Filed: Jan. 20, 2006

(65) Prior Publication Data
US 2006/0280502 A1  Dec. 14, 2006

(30) Foreign Application Priority Data
Jun. 8, 2005  (JP)  ............................ 2005-167764

(51) Int. Cl.
*H04J 14/00* (2006.01)
(52) U.S. Cl. ............................. 398/72; 398/66; 398/67; 398/68; 398/69; 398/70; 398/71; 398/79; 398/202; 398/208; 398/209; 398/25; 398/26; 398/27; 398/33; 398/100; 370/389; 370/420; 370/432; 370/442; 370/436; 725/121; 725/125; 725/127; 725/129; 725/106
(58) Field of Classification Search ................... 398/66, 398/67, 68, 69, 70, 71, 72, 79, 98, 99, 100, 398/25, 26, 27, 33, 158, 159, 202, 208, 209; 370/389, 420, 432, 431, 442, 436; 725/121, 725/125, 127, 129, 106
See application file for complete search history.

(56) References Cited
U.S. PATENT DOCUMENTS 6,647,210 B1 * 11/2003 Toyoda et al. ............... 398/102

7,127,167 B2 * 10/2006 Sala et al. ..................... 398/72

OTHER PUBLICATIONS

Tetsuya Yokotani et al., "Queuing Models for Media Access Control on PON", The Institute of Electronics, Information and Communication Engineers (IEICE), Technical Report, Nov. 2003, in Japanese with English abstract, pp. 7-10.
Tetsuya Yokotani et al., "Media Access Control in PON system for Optical Access Network", The Institute of Electronics, Information and Communication Engineers (IEICE), Technical Report, Jun. 2003, in Japanese with English abstract, pp. 7-12.

* cited by examiner

*Primary Examiner*—Hanh Phan
(74) *Attorney, Agent, or Firm*—Reed Smith LLP; Stanley P. Fisher, Esq.; Juan Carlos A. Marquez, Esq.

(57) ABSTRACT

An optical access network system having a function of correcting upstream signal waveform distortions occurring in the PON section, wherein a central office side apparatus comprises a main controller to notify each subscriber connection apparatus of a transmission grant period, an equalizer of a tap gain adaptive control type to correct waveform distortions of signals received from the subscriber connection apparatuses, an equalizer controller, and a parameter table for storing, for each subscriber connection apparatus, the initial values of tap gains to be set for the equalizer. The main controller issues a switchover request for switching the equalization characteristic to the equalizer controller each time notifying a subscriber connection apparatus of a transmission grant period, and the equalizer controller retrieves the initial values of the tap gains for the subscriber connection apparatus from the parameter table in response to the switchover request, and sets these values to the equalizer.

12 Claims, 15 Drawing Sheets

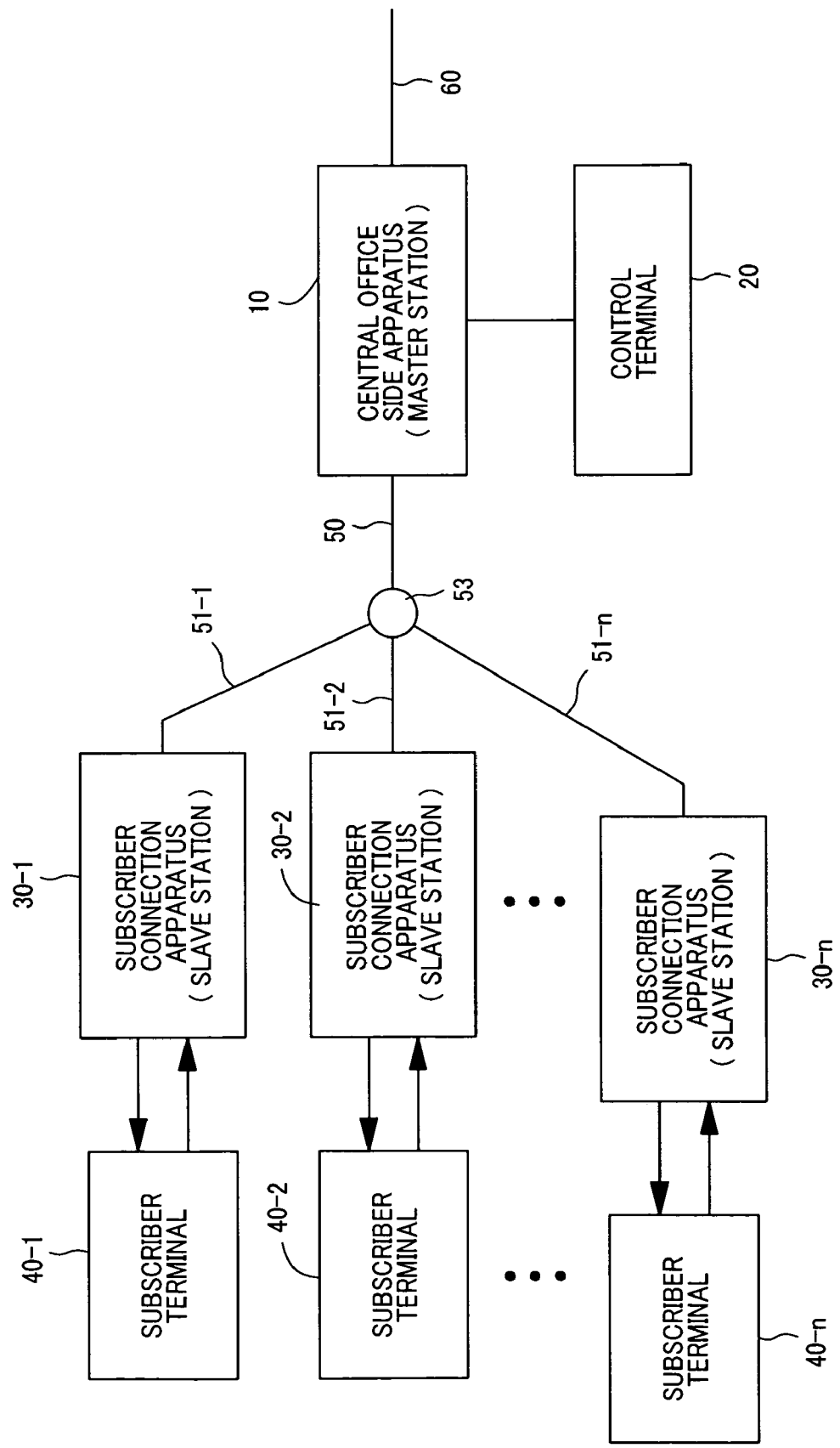

FIG. 7

PARAMETER TABLE 140

| SLAVE STATION ID | TAP GAIN VALUES | | | | 140B EQUALIZATION PARAMETER TABLE FOR FB FILTER |
|---|---|---|---|---|---|
| | 1 | 2 | ... | n | |
| 1 | ×11 | ×12 | ... | ×1n | |
| 2 | ×21 | ×22 | ... | ×2n | |
| ⋮ | ⋮ | ⋮ | ⋮ | ⋮ | |

140A EQUALIZATION PARAMETER TABLE FOR FF FILTER 140-1, 140-2, 141, 142-1, 142-n

OPTICAL ACCESS NETWORK SYSTEM

CLAIM OF PRIORITY

The present application claims priority from Japanese application Ser. No. 2005-167764, filed on Jun. 8, 2005, the content of which is hereby incorporated by reference into this application.

BACKGROUND OF THE INVENTION (1) Field of the Invention

The present invention relates to an optical access network system and, more particularly, to an optical access network system where a passive optical network (PON) connects a central office side apparatus and a plurality of subscriber connection apparatuses connected to subscriber terminals and each subscriber connection apparatus transmits data during a transmission grant period assigned from the central office side apparatus.

(2) Description of Related Art

Recently, higher speed access networks have been developed, required by the proliferation of Internet and an expanding demand for service of access to a huge volume of data such as video streams to be delivered. As measures for providing a higher speed access network, so-called Fiber to the Home (FTTH) schemes in which optical fibers are used as subscriber lines are becoming a mainstream. As one FTTH scheme, attention focuses on a PON system where an optical fiber is shared by a plurality of subscribers. The PON is also called a Passive Double Star (PDS) or Point to Multipoint (P-MP).

In the PON system, a plurality of branch optical fibers which are connected, respectively, to subscriber connection apparatuses, Optical Network Units (ONUs; slave stations), are joined into a single optical fiber by a star coupler (optical splitter) and the optical fiber between the star coupler and a central office side apparatus, Optical Line Terminal (OLT; master station) is shared by a plurality of subscribers. Thus, the PON system enables a great reduction in the optical fiber infrastructure cost. The PON system is classified into, for example, a Broadband PON (B-PON) for transmitting information in ATM cells, a Giga-bit PON (G-PON) enabling high-speed data transfer in the order of gigabits per second, and a Giga-Ethernet PON (GE-PON) appropriate for Ethernet service.

In the PON system, data transmission (downstream communication) from the master station to slave stations is performed in a multicast communication manner and data packets or frames transmitted from the master station are distributed by the star coupler to the plurality of branch optical fibers. Each slave station interprets the destination address of each received packet and selectively forwards only packets addressed thereto to its destination subscriber device. On the other hand, data transmission (upstream communication) from each slave station to the master station is performed in time division multiplexing. Data packets or frames transmitted over the branch optical fibers from each slave station are multiplexed onto a single optical fiber by an optical coupler. To avoid collision of upstream data packets on the optical fiber in the PON system, upstream data transmission is controlled from the master station by assigning a packet transmission grant period to each slave station.

Branch optical fiber sections in the PON are unequal in length and upstream signal propagation time from each slave station to the master station varies. Therefore, it is needed to know in advance the upstream signal propagation time from each slave station in order to assign an appropriate packet transmission period to each slave station and to prevent collision of packets passed through the branch optical fibers and multiplexed on the shared optical fiber. When a new slave station has been connected to the PON system, a special communication takes place to realize the functions of detecting the slave station by the master station, measuring the propagation time between the slave station and the master station, and registering in the master station the identifier of the slave station and the propagation time. This series of communication is called a ranging process. The signal propagation time measured for each slave station is stored into a management table on the master station.

The master station assigns a transmission grant period to each slave station in response to a data transmission request from the slave station. For example, in the B-PON system where upstream communication is performed in units of a cell having a fixed length of 56 bytes, i.e., a 53-byte ATM cell plus a 3-byte overhead, the master station periodically inserts a transmission grant signal in downstream traffic, thereby to notify each slave station of time slot numbers. In the G-PON that is capable of carrying variable-length packets, a transmission grant period is specified with a set of a transmission start time and a transmission end time. In the GE-PON, a transmission grant period is specified with a transmission start time and the number of bytes to be occupied. Approaches for management of upstream packet transmission timing in the PON are described in, for example, Yokotani, Mukai, Oshima, "Queuing Models for Media Access Control on PON," The Institute of Electronics, Information and Communication Engineers (IEICE), Shingakugiho CS2003-109, pp. 7-10, November 2003 (Non-patent document 1) and Yokotani, Murakami, Mukai, Oshima, "Media Access Control in PON System for Optical Access Network," The IEICE, Shingakugiho IN2003-25, pp. 7-12, June 2003 (Non-patent document 2).

However, a problem associated with the PON system using an optical fiber and a plurality of branch optical fibers as its transmission path is deterioration of signal waveforms due to optical dispersion along the optical fibers.

FIG. 2A shows a logical sequence of upstream packets that are time division multiplexed on the optical fiber. P(A) to P(N) denote packets transmitted from slave stations A to N through branch optical fibers with different lengths. For example, in the case of intensity modulation light, these packets are physically propagated on the optical fiber as optical waveforms S(A) to S(N) with light intensity levels changed, as shown in FIG. 2B.

An optical signal propagating through an optical fiber comprises, strictly speaking, a plurality of wavelength components (spectrum spread) and its group velocity has wavelength dependency. This wavelength dependency is generally called dispersion (group velocity dispersion). A dispersion characteristic has a great effect on signal waveforms passing through the optical fiber. This is because, in the optical fiber with a wavelength-dependent group velocity, a wavelength component traveling slowly and a wavelength component traveling fast appear, which results in spread waveforms. If the value of dispersion is zero or negligibly small, no waveform distortions caused by dispersion occur and rectangular waveforms are kept, as shown in FIG. 2B. However, if the value of dispersion is not negligible, waveform distortions occur in optical signals. The waveform distortion becomes larger in a signal light passed through a longer fiber, because dispersion is proportional to fiber length.

FIG. 2C shows emphasized waveform distortions caused by dispersion. No waveform distortion occurs in a transmission signal S(A) from a slave station A at a short distance from the master station, whereas a waveform distortion occurs in a transmission signal S(B) from a slave station B at a long distance from the master station. A greater waveform distortion occurs in a transmit signal S(N) from a slave station C at the longest distance from the master station. If the value of dispersion is great and the distance of optical signal propagation is extremely long, there is a possibility that the waveform is distorted to a degree that received data becomes indiscriminative at the master station.

To describe quantitatively, in the case of Single Mode Fibers (SMF) which are the most popular optical fibers, the value of dispersion per distance is approximately 17 ps/nm per kilometer and the value of dispersion for a 20 km long optical fiber reaches 340 ps/nm. If a data transmission rate is 10 Gbps, spectrum spreading in the order of at least 5 GHz occurs. This is equivalent to waveform spreading of about 0.04 nm.

A 10 GHz optical signal has a pulse width of about 100 ps, but a pulse spread of about 14 ps occurs in a 20 km long SMF from an estimation of 340 ps/nm×0.04 nm=14 ps. This value is calculated when a transmission signal is optically modulated with a relatively expensive external modulator at a slave station. The pulse width spreading will be greater than the above value, if an inexpensive optical transmitter that directly modulates a light output from a semiconductor laser is used. Consequently, when upstream packets arrive at the master station, there is a possibility that adjacent pulse waveforms overlap together and it becomes hard for the master station to correctly discriminate a 100 ps wide pulse from a pulse sequence received.

However, the above signal waveform spreading caused by dispersion has an almost negligible effect on current PON systems (B-PON, GE-PON, and G-PON), since the existing PON systems use, as an upstream signal wavelength, a 1.3 μm band in which dispersion along a fiber is approximately zero and the transmission rate applied in the PON systems is in the order of 155 Mbps to 2 Gbps.

If an inexpensive optical device with a broad spectral width such as, e.g., a Fabri-Perot Semiconductor Laser (FP-LD) is applied in an optical transmitter at a slave station for the purpose of reducing equipment cost, signal waveform distortion caused by dispersion along an optical transmission path will become non-negligible. In future, if the transmission rate will rise to, e.g., 10 Gbps or higher to further speed up an optical access network, or if a signal light in a 1.5 μm band in which dispersion is inevitable will be used as a wavelength for upstream communication, the same problem as described above will occur.

The influence of signal waveform distortion caused by dispersion can be avoided by applying a dispersion compensator, e.g., a dispersion-compensating fiber having a value of dispersion opposite to that along the optical transmission path. In the PON system, dispersion compensation that varies for each slave station is required because of different lengths of branch optical fibers from the slave stations to the star coupler.

Therefore, for example, in the case where dispersion compensation is performed at the master station, it is needed to adjust the amount of compensation for each received packet, that is, for each of the optical signals S(A) to S(N) shown in FIG. 2C by applying a dispersion compensator with a variable amount of compensation (dispersion).

In this case, if the master station tries to receive information from all packets arrived thereto varying its signal property at a high speed in the order of 100 ns, the amount of compensation (dispersion) of the dispersion compensator must be switched at a higher speed in the order of 10 ns and the master station must receive the next transmission packet after rapidly stabilizing the characteristics of the dispersion compensator. However, an optical device for variable dispersion compensation enabling such a high-speed control does not achieve on a practical level as it is now. Meanwhile, an individual dispersion compensator may be installed at each slave station, for example, at the slave station end of each branch optical fiber. In this case, dispersion compensators as many as the number of slave stations are required and, as a result, the system cost increases.

SUMMARY OF THE INVENTION

An object of the present invention is to provide an optical access network system having a function of correcting upstream signal waveform distortions occurring in a passive optical network (PON).

To achieve the above object, in an optical access network system of the present invention, an central office side apparatus (master station) connected to the PON comprises a main controller to notify each subscriber connection apparatus (slave station) of a transmission grant period, an equalizer of a tap gain adaptive control type to correct waveform distortions of signals received from subscriber connection apparatuses, an equalizer controller for setting initial values of tap gains to the equalizer, and a parameter table for storing the initial values of the tap gains to be set to the equalizer, in association with identifiers of the subscriber connection apparatus.

The main controller issues a switchover request for switching an equalization characteristic to the equalizer controller, designating the identifier of a subscriber connection apparatus each time notifying the subscriber connection apparatus of a transmission grant period, and the equalizer controller retrieves, in response to said switchover request, the initial values of the tap gains corresponding to the designated identifier from the parameter table and sets the initial values of the tap gains to the equalizer.

In an embodiment of the present invention, the main controller issues the switchover request for switching the equalization characteristic at a specific timing determined based on a start time of the transmission grant period, a delay time of signal transmission on a transmission path from the subscriber connection apparatus to the central office side apparatus, and a control delay time in switching the equalization characteristic by the equalizer controller.

In another embodiment of the present invention, the switchover request for switching the equalization characteristic includes a start time of the transmission grant period and a signal transmission delay time on a transmission path from the subscriber connection apparatus to the central office side apparatus, and the equalizer controller determines timing to switch the tap gains of the equalizer based on the start time and the transmission delay time specified in the switchover request, and sets the initial values of the tap gains to the equalizer at that timing.

In yet another embodiment of the present invention, the equalizer controller sets the initial values of the tap gains to the equalizer after fetching present values of the tap gains from the equalizer in response to the switchover request from the main controller and storing these values into the parameter table as new initial values of the tap gains in association with the identifier of the subscriber connection apparatus that has completed data transmission.

In further another embodiment of the present invention, the switchover request for switching the equalization characteristic includes a start time of the transmission grant period, a transmission period, and a signal transmission delay time on a transmission path from the subscriber connection apparatus to the central office side apparatus, and the equalizer controller determines a timing to switch the tap gains of the equalizer based on the start time and the transmission delay time specified in the switchover request, sets the initial values of the tap gains to the equalizer at that timing, and fetches present values of the tap gains from the equalizer after the transmission period specified in the switchover request has elapsed, and stores these values into the parameter table as new initial values of the tap gains in association with the identifier of the subscriber connection apparatus that has completed data transmission.

The switchover request for switching the equalization characteristic may include a transmission end time instead of the transmission period. In this case, the equalizer controller may fetch the present values of the tap gains from the equalizer at a specific timing determined by the end time and the transmission delay time specified in the switchover request and store these values into the parameter table as new initial values of the tap gains in association with the identifier of the subscriber connection apparatus that has completed data transmission.

More specifically, in the optical access network system of the present invention, the equalizer comprises, for example, a filter unit including a plurality of variable gain amplifiers for receiving, as optical-to-electrical converted tap signals with different delays, a signal received from said subscriber connection apparatus, a discriminator for discriminating a signal output from the filter unit, and a tap gain controller for performing adaptive gain control of each of said variable gain amplifiers according to a difference between input and output signals of said discriminator and said tap signals input to the variable gain amplifiers, and the tap gain controller includes a parameter register for setting the initial values of tap gains given from the equalizer controller to the variable gain amplifiers as initial values. In this configuration, by holding in the parameter register, during operation of the tap gain controller, latest gain values of said amplifiers under adaptive control instead of said initial values, the equalizer controller can fetch the present values of the tap gains from the parameter register.

According to the optical access network system of the present invention, since the central office side apparatus is equipped with an equalizer of the tap gain adaptive control type to correct waveform distortions of signals received from the subscriber connection apparatuses and a equalizer controller, an optimum equalization characteristic for correcting the waveform distortions of received signals can be obtained by properly switching the tap gains of the equalizer according to the transmission period of each slave station.

In the case where the present values of the tap gains have been fetched from the equalizer and stored as new initial values of the tap gains in association with the identifier of the subscriber connection apparatus that has completed data transmission, the adaptive control of the equalizer can be restarted from an optimum state upon switching the tap gains.

BRIEF DESCRIPTION OF THE DRAWINGS

FIG. 1 shows a configuration of a PON system to which the present invention is applied.

FIG. 7 shows an example of the contents of a parameter table 140.

DETAILED DESCRIPTION OF THE PREFERRED EMBODIMENTS

Figure 2A:
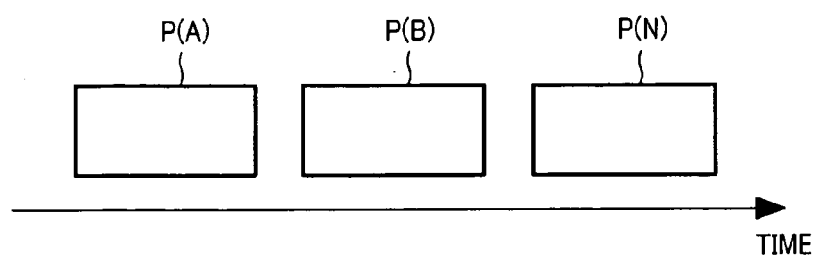
FIGS. 2A to 2C illustrate deterioration of optical waveforms in the PON.
Figure 2B:
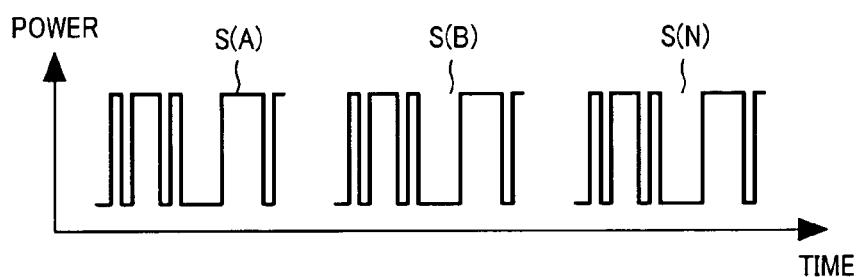
Figure 2C:
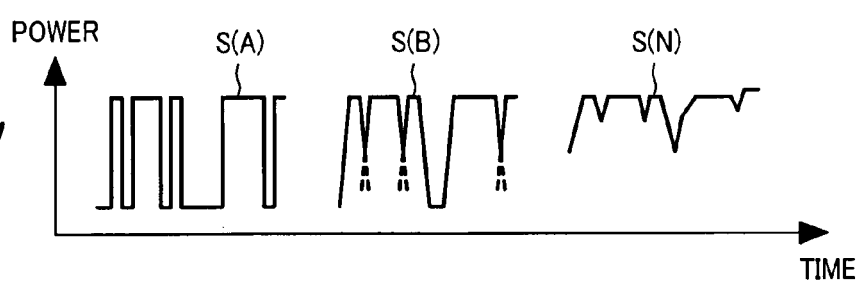

The present invention will be described in detail hereinafter with reference to the drawings.

FIG. 1 shows a configuration of a PON system to which the present invention is applied.

The PON system comprises a central office side apparatus OLT (master station) 10, a control terminal 20 connected to the master station 10, a plurality of subscriber connection apparatuses ONUs (slave stations) 30 (30-1 to 30-n), subscriber terminals 40 (40-1 to 40-n) accommodated by each slave station 30, and a passive optical network (PON) connecting the master station 10 and slave stations. The master station is connected to another network or an upper level system by a transmission line 60.

The optical network between the master station 10 and the slave stations 30 comprises a common optical fiber 50 connected to the master station 10 and branch optical fibers 51-i (i=1 to n) connected to each slave station 30. The branch optical fibers 51-i diverge from the optical fiber 50 at a star coupler or a optical splitter 53. Downstream data packets or downstream frames transmitted to the optical fiber by the master station 10 are distributed to all branch optical fibers 51 by the star coupler 53 and delivered to all slave stations 30. Each slave station 30-i (i=1 to n) interprets the destination address of each received packet, selectively receives a packet addressed thereto, and outputs the packet to the destination subscriber terminal 40-i connected downstream. Upstream data packets or upstream frames transmitted to the branch optical fibers 51 by the slave stations 30-i (i=1 to n) are gathered and transferred to the optical coupler 50 by the optical coupler 53 and arrive at the master station in a time division multiplexed sequence.

Figure 3:
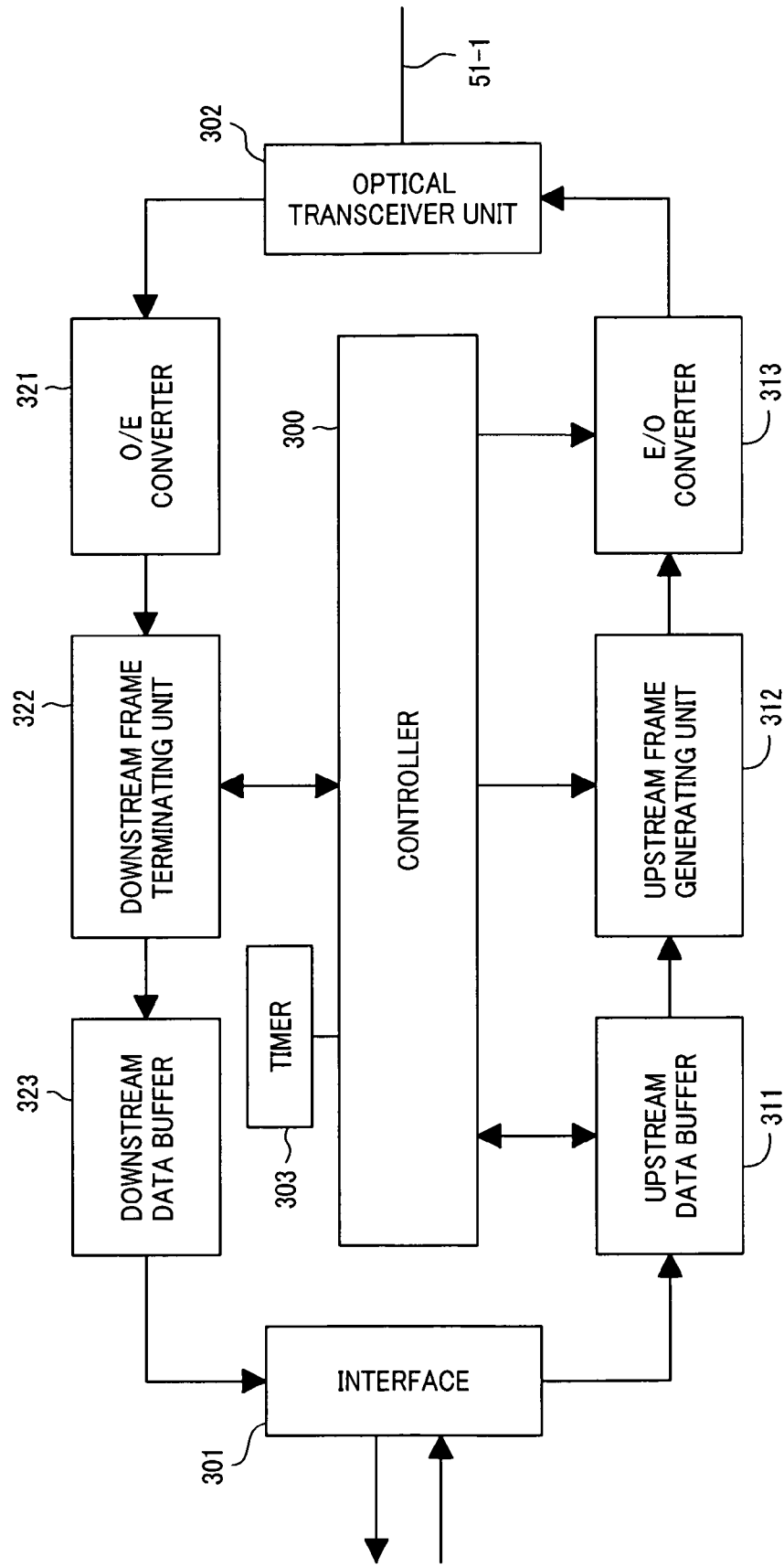
FIG. 3 is a block diagram showing an example of a configuration of a subscriber connection apparatus (slave station) 30-1 in FIG. 1.

FIG. 3 shows an example of a configuration of a slave station (subscriber connection apparatus) 30-1. Other slave stations have the same configuration.

The slave station 30-1 comprises a controller 300 equipped with a timer 303, an interface 301 to connect to a subscriber terminal 40-1, an optical transceiver unit 302 connected to a branch optical fiber 51-1, and a downstream signal processing circuit and an upstream signal processing circuit between the interface 301 and the optical transceiver unit 302.

The downstream signal processing circuit comprises an optical-to-electrical (O/E) converter 321 to convert downstream optical signals received by the optical transceiver unit 302 into electrical signals, a downstream frame terminating unit (PON terminator) 322 connected to the O/E converter 321, and a downstream data buffer 323 which temporarily stores received data output from the downstream frame terminating unit (PON terminator) 322 and outputs the received data to the interface 301.

The upstream signal processing circuit comprises a upstream data buffer 311 which temporarily stores data transmitted from the subscriber terminal 40-1 and received via the interface 301, an upstream frame generating unit 312 for converting transmission data output from the upstream data buffer 311 into PON upstream frames or packets, and an electrical-to-optical (E/O) converter 313 for converting upstream data output from the upstream frame generating unit 312 into optical signals and outputs the optical signals to the optical transceiver unit 302.

The downstream frame terminating unit 322 performs received signal termination processing in accordance with a format of downstream frame applied in the PON and analyzes a packet received from the master station 10. If the received packet is a control packet, the terminating unit 322 outputs it to the controller 300. If the received packet is a user packet, the terminating unit 322 selects only a packet having a destination address that matches with the address of slave station having been set in advance and outputs the packet to the downstream data buffer 323.

The controller 300 monitors the status of stored data in the upstream data buffer 311 and transmits a data transmission request to the master station 10 via the upstream frame generating unit 312 when data transmission is required. This data transmission request may be transmitted in the form of independent control packet as in the B-PON and GE-PON or may be described in a protocol header of a data packet as in the G-PON.

A notification packet of transmission grant period (transmission timing) transmitted from the master station 10 in response to the data transmission request is received by the downstream terminating unit 322 and transferred to the controller 300. The transmission grant period is specified as a set of a transmission start time and a transmission end time or a set of a transmission start time and transmission duration.

Upon receiving the above notification packet of transmission grant period, the controller 300 instructs the upstream frame generating unit 312 to start data packet transmission at the transmission timing specified in the received packet, and instructs the upstream frame generating unit 312 to stop the data packet transmission when the transmission end time has come. If an independent control packet is used for the data transmission request as in the B-PON and GE-PON, the data transmission request packet will be transmitted together with other data packets during the transmission grant period.

Figure 4:
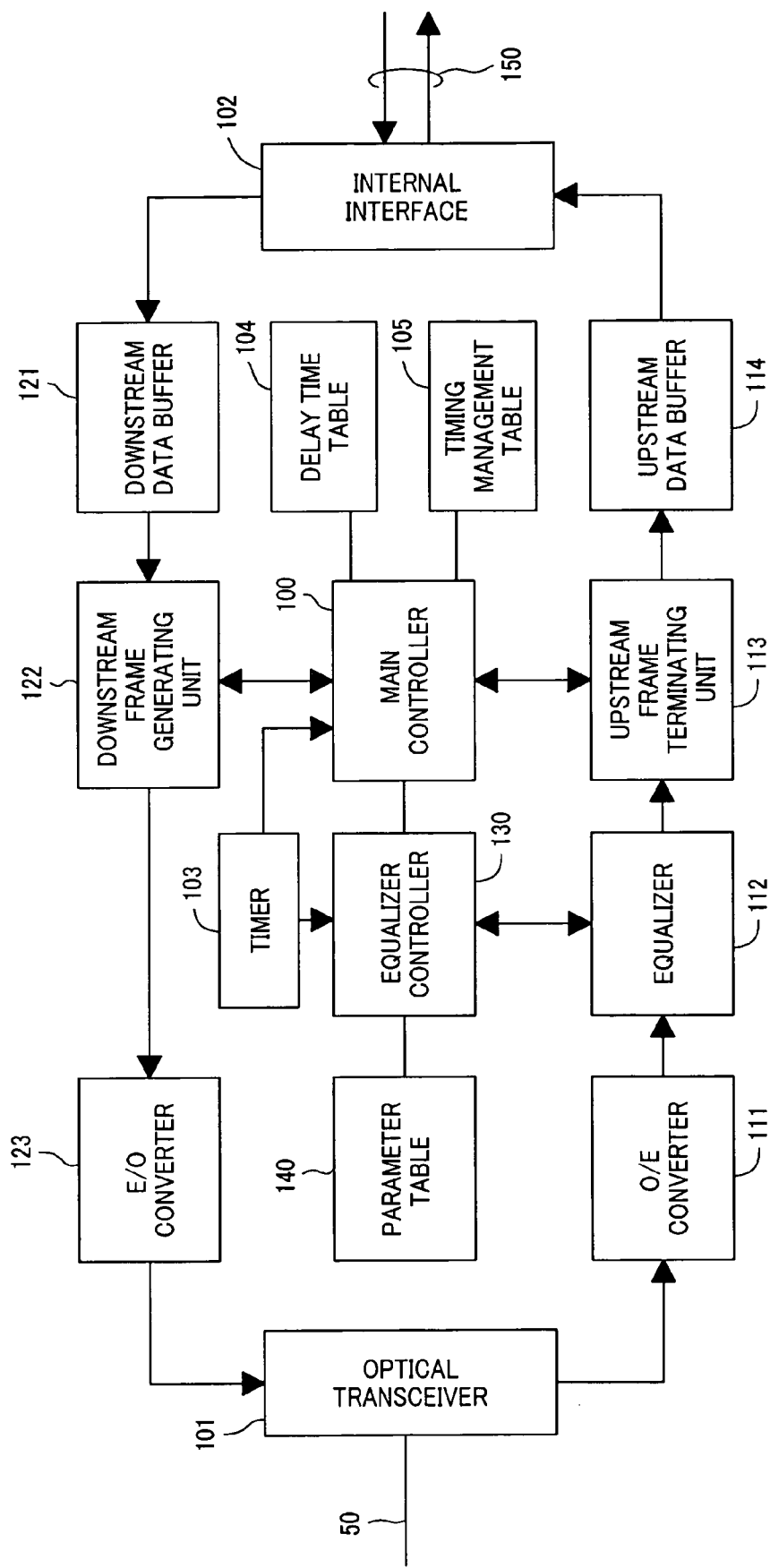
FIG. 4 is a block diagram showing an example of a configuration of a central office side apparatus (master station) 10 in FIG. 1.

FIG. 4 shows an example of a configuration of the master station (central office side apparatus) 10.

The master station 10 comprises a main controller 100, an optical transceiver 101 connected to the optical fiber 50, an internal interface 102 connected to an internal transmission line 150, and a downstream signal processing circuit and an upstream signal processing circuit provided between the optical transceiver 101 and the internal interface 102. If communication packets or frames on the transmission line 60 have a different format from communication packets or frames on the optical fiber 50, the master station must make protocol conversion between these communication packets or frames. In this case, the internal transmission line 150 is connected to a processing unit for that protocol conversion.

The upstream signal processing circuit of the master station 10 comprises an optical-to-electrical (O/E) converter 111 to convert optical signals received by the optical transceiver 101 into electrical signals, an equalizer 112 connected to the O/E converter 111, an upstream frame terminating unit (PON terminator) 113 connected to the equalizer 112, and an upstream data buffer 114 for temporarily storing upstream data output from the upstream frame terminating unit 113 and outputting the upstream data to the internal interface 102.

On the other hand, the downstream signal processing circuit of the master station 10 comprises a downstream data buffer 121 for temporarily storing transmission data that are received via the internal interface 101 and addressed to subscriber terminals, a downstream frame generating unit 122 for arranging transmission data output from the downstream data buffer 121 into a PON downstream frame, and an electrical-to-optical (E/O) converter 123 for converting downstream frame output from the downstream frame generating unit 122 into optical signals and outputting the optical signals to the optical transceiver 101.

The main controller 100 is equipped with a timer 103, a delay time table 104 for storing a delay time of signal propagation from each slave station, measured in the ranging process, and a timing management table 105 for storing the results of assignments of transmission grant periods to the slave stations.

A feature of the present invention resides in that the master station 10 is equipped with a equalizer controller 130 which is connected to the main controller 100 and the equalizer 112. The equalizer controller 130 operates to switch the characteristic of the equalizer 112 appropriately for a slave station that is now transmitting data to optimize received signal waveforms. The equalizer controller 130 is equipped with a parameter table 140 for storing equalization parameters to be set for the equalizer 112 in association with each slave station identifier. As the equalizer 112, an equalizer of a tap gain adaptive control type is applied.

Upstream signals transmitted from each slave station 30 are converted into electrical signals by the O/E converter 111 and the electrical signals are input to the upstream frame terminating unit 113 after their waveform distortion is corrected by the equalizer 112. The upstream frame terminating unit 113 performs received signal termination processing according to an upstream signal frame format applied in the PON and analyzes upstream packets so that control packets are transferred to the main controller 110 and data packets are stored into the upstream data buffer 114.

Data packets stored in the upstream data buffer 114 are output to the internal transmission line 150 via the internal interface 102. On the other hand, downstream data packets received from the internal transmission line 150 are input from the internal interface 102 to the downstream data buffer 121. After being buffered, the downstream data packets are arranged into a PON downstream frame by the downstream frame generating unit 122, converted into optical signals by the E/O converter 123, and transmitted to the optical fiber 50 from the optical transceiver 101.

Upon receiving from the upstream frame terminating unit 113 a data transmission request issued from a slave station as a control packet, the main controller 100 determines a transmission grant period to be assigned to the requester slave station by referring to the delay time table 104 and the timing management table 105. The transmission grant period is specified with a transmission start time and a transmission end time, for example, in the case of G-PON, by selecting a time zone during which a transmission packet from the requesting slave station will not collide with transmission packets from the other slave stations on the optical fiber 50. A notification packet of the transmission grant period is assembled into a PON downstream frame by the downstream frame generating unit 122 and transmitted to the requester slave station. In the present invention, each time assigning a transmission grant period to a slave station, the main controller 100 issues a switchover request for switching the equalizer characteristic to the equalizer controller 130. The switchover request includes the slave station identifier.

Upon receiving the switchover request from the main controller 100, the equalizer controller 130 retrieves equalization parameters corresponding to the slave station ID from the parameter table 140 and sets the parameters to the equalizer 112. Switching the equalization parameters of the equalizer 112 is performed at timing immediately before the transmission data from the slave station arrives at the equalizer, as will be described later.

Figure 5:
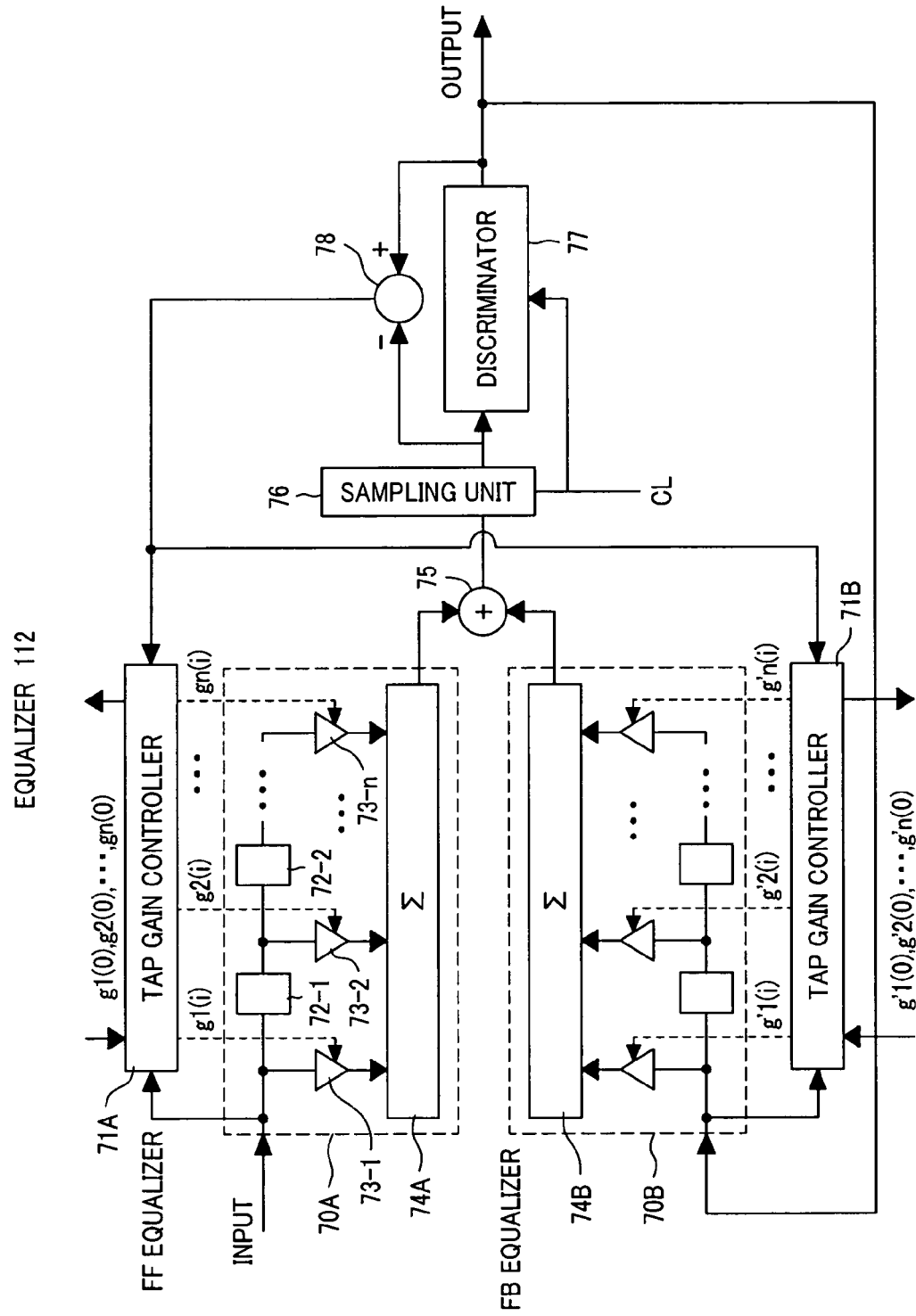
FIG. 5 shows an embodiment of an equalizer 112.

FIG. 5 shows an embodiment of the equalizer 112.

The equalizer 112 illustrated here comprises a feed forward (FF) filter 70A, a tap gain controller 71A for the FF filter, a feedback (FB) filter 70B, a tap gain controller 71B for the FB filter, an adder 75 which adds the output of the FF filter 70A and the output of the FB filter 70B, a sampling unit 76 for sampling the value of output signal of the adder 75 in sync with a clock CL, a discriminator 77 for discriminating the output signal from the sampling circuit 76 as "1" or "0" based on a predetermine threshold, and a comparator 78 which determines the difference between the values of input signal and output signal of the discriminator 77.

Although the equalizer 112 shown here is configured with the FF equalizer 70A and the FB equalizer 70B that share the circuit elements from the adder 75 to the comparator 78, the FB equalizer 70B may be omitted from the equalizer 112.

The FF filter 70A and the FB filter 70B are transversal type filters, each comprising a plurality of delay elements 72 (72-1, 72-2, etc.) connected in multiple stages for outputting an input signal from the O/E converter 111 as a plurality of tap signals with different delays, a plurality of variable gain amplifiers 73 (73-1 to 73-n) to which these tap signals are input, respectively, and an adder 74 (74A or 74B) which adds the outputs of these variable gain amplifiers 73. The filter characteristic can be changed depending on the combinations of the number of delay stages and the tap gains.

The FF filter tap gain controller 71A controls the gains (tap gains) of the variable gain amplifiers 73 in the FF filter 70A by using, as a control parameter, a difference signal (error signal) between the input and output of the discriminator 77 indicated with the output from the comparator 78. The FF filter 70A can perform feed forward type gain control by inputting a signal from the O/E converter 11 to the filter.

The FB filter tap gain controller 71B also controls the tap gains in the FB filter 70B by using, as a control parameter, the difference signal (error signal) between the input and output of the discriminator 77 indicated with the output from the comparator 78. The FB filter 70B can perform feedback type gain control by inputting the output signal of the discriminator 77 to the filter.

Figure 6:
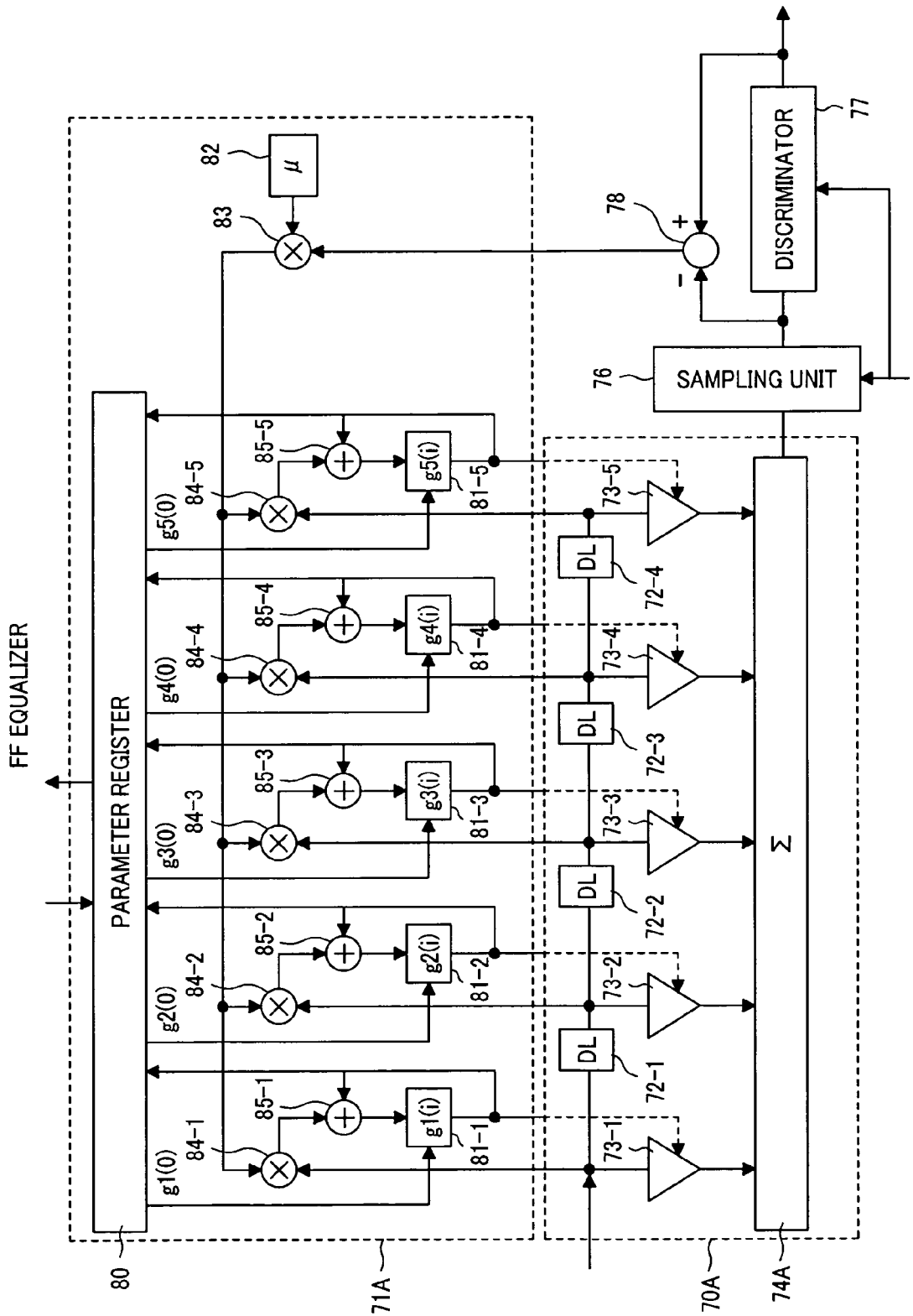
FIG. 6 shows an embodiment of a tap gain controller 71A of an FF equalizer.

As a control algorithm for the equalizer, for example, a Least Mean Square (LMS) method is well known. FIG. 6 shows an embodiment of the tap gain controller 71A of the FF equalizer using the LMS method. To simplify the drawing, the FF filter 70A with five taps is shown here, which comprises four stages of delay elements 72-1 to 72-4, five tap gain amplifiers 73-1 to 73-5, and the adder 74A. However, the number of taps of the FF filter 70A is arbitrary.

When the LMS method is used, the gain value "gn" of the n-th tap (n=1 through 5) in state (i+1) is expressed as follows:

$$gn(i+1)=gn(i)+\mu \times pn(i) \times e(i) \qquad (1)$$

where pn(i) denotes an input value to the n-th tap in state i, e(i) denotes a difference signal (error signal) between the input and output signals of the discriminator 77 in state i, and μ denotes a constant representing calculation convergence.

The tap gain controller 71A shown in FIG. 6 determines the gain value of each tap at the next stage (i+1) from the gain value of each tap at the present stage (state i) successively, according to the above equation. The tap gain controller 71A comprises a parameter register 80 accessible from the equalizer controller 130, a plurality of tap gain memories 81 (81-1 to 81-5) whose initial values are given from the parameter register 80, a convergence constant register 82, a multiplier 83 for multiplying the convergence constant μ provided from the convergence constant register 82 by the difference signal (error signal) output from the comparator 78, a plurality of multipliers 84 (84-1 to 84-5) each for multiplying the output of the multiplier 83 by the output of each tap of the FF filter 70A, and adders 85 (85-1 to 85-5) each for adding the output of each multiplier 84 and the output of each tap gain memory 81 to output the result of the addition to the tap gain memory 81 (81-1 to 81-5).

Each of the variable gain amplifiers 73 (73-1 to 73-5) of the FF filter 70A amplifies its input signal in accordance with the tap gain provided from each tap gain memory 81 (81-1 to 81-5). The tap gain values initially set in the tap gain memories 81 (81-1 to 81-5.) are automatically modified so that the difference (error signal) between the input and output signals of the discriminator 78 becomes zero by adaptive control of the tap gain controller 71A.

The speed of convergence of the tap gain values changes depending on a set of initial values (g1(0), g2(0), etc.) given from the parameter register 80. In the present embodiment, the latest tap gain values provided by the tap gain memories 81 (81-1 to 81-5) are held in the parameter register 80 and the tap gain values converged by adaptive control can be fetched by the equalizer controller 130 when the equalization characteristic is switched. The equalizer controller 130 stores a set of tap gain values fetched from the parameter register 80 into the parameter table 140 and applies these values as the set of initial values (g1(0), g2(0), etc.) when the same slave station transmits data next time, thereby to switch the equalizer characteristic to an optimum state fit for the slave station at once.

While the tap gain controller 71A for FF filter is shown in FIG. 6, the tap gain controller 71B for FB filter is also able to adjust the FB filter to an optimum characteristic for a slave station by changing a set of gain values to be given to the parameter register 80. In the example of FIG. 6, although the convergence constant μ is assumed to be a fixed value, the value of μ may be changed so as to fit a slave station or changed according to the convergence condition during adaptive control.

FIG. 7 illustrates the contents of the parameter table 140.

The parameter table 140 comprises an equalization parameter table 140A for FF filter 70A and an equalization parameter table 140B for FB filter 70B. Each table comprises a plurality of table entries 140-1, 140-2, etc., each having a slave station ID 141. Each table entry specifies a set of tap gain values 142-1 to 142-n to be given as initial values to the tap gain memories 81 (81-1, 81-2, etc.).

For example, tap gain values (g1(0), g2(0), etc.) which are converged by adjusting the FF filter 70A (or FB filter 70B) to cancel out an amount of dispersion estimated from the distance of a transmission line between a slave station 30-1 with ID=1 and the master station 10 are calculated in advance and these values are stored as a set of tap gain values (x11, x12, etc.) in an entry 140-1 of the table. Likewise, for a slave station 30-2 with ID=2, tap gain values (g1(0), g2(0), etc.) to cancel out an amount of dispersion occurring along the optical transmission line from that station are calculated in advance and these values are stored as a set of tap gain values (x21, x22, etc.) in an entry 140-2 of the table.

Upon receiving a switchover request, with a slave station ID, to switch the equalization characteristic from the main controller 100, the equalizer controller 130 retrieves a set of tap gain values in the entry corresponding to the specified slave station ID from the equalization parameter tables 140A and 140B and sets these values to the parameter register 80 of the FF filter tap gain controller 71A and the parameter register 80 of the FB filter tap gain controller 71B. Thereby, the tap gain values (g1(0), g2(0), etc.) adjusted to cancel out the estimated amount of dispersion can be set at timing immediately before a packet transmitted from the slave station 30-1 actually arrives.

In the following, embodiments of switching the equalization characteristic by the equalizer controller 130 will be described with reference to FIGS. 8 to 15.

First Embodiment

Figure 8:
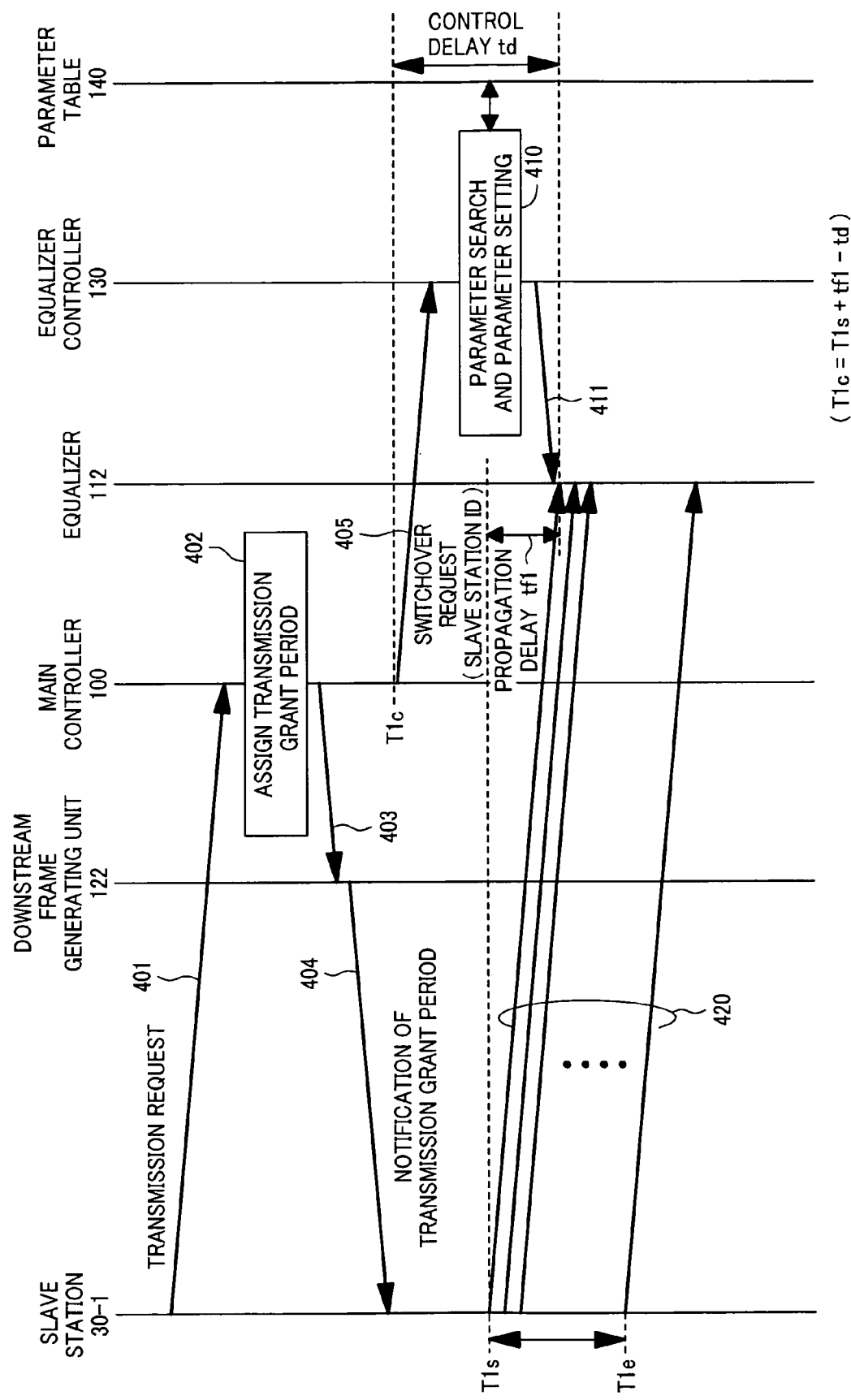
FIG. 8 shows a control sequence of a first embodiment of equalization characteristic switchover.

FIG. 8 shows a control sequence of a first embodiment of switching the equalization characteristic.

For example, a slave station 30-1 that wants to transmit data issues a transmission request to the master station 10 (401) before transmitting actual data. The data transmission request is received by the upstream frame terminating unit 113 and transferred to the main controller 100 in the master station 10. The main controller 100 determines a transmission grant period, during which no collision with upstream packets from the other slave station will occur, by referring to the timing management table 105 and taking account of a delay time of transmission signal from the slave station 30-1 specified in the delay time table 104, and assigns that period to the requester slave station 30-1 (402). Although the transmission grant period is assumed to be specified as a transmission start time T1s and a transmission end time T1e in the description herein, it may be designated as a set of a transmission start time and duration of occupation of the transmission path. If transmission packets are of fixed length, the above period may be designated in time slot numbers predefined for upstream PON frames.

After determining the transmission grant period for the slave station 30-1, the main controller 100 instructs the downstream frame generating unit 122 to generate a notification packet of the transmission grant period (403). Then, the downstream frame generating unit 122 generates a notification packet of the transmission grant period, designating the period with the transmission start time T1s and the transmission end time T1e. This packet is addressed to the slave station 30-1 and transmitted to the optical fiber 50 via the E/O converter 123 and the optical transceiver 101 (404).

In the first embodiment, the main controller 100 calculates a directive timing "T1c" based on the transmission start time "T1s" notified to the slave station 30-1, a transmission delay time "tf1" until a signal transmitted from the slave station 30-1 arrives at the master station 10, and a control delay time "td" which will be elapsed until parameter setting for the equalizer 112 is completed after the main controller 100 issues a switchover request to the equalizer controller 130, according to the following equation:

$$T1c = T1s + tf1 - td \qquad (2)$$

When the directive timing T1c has come, the main controller 100 issues a switchover request for switching the equalization characteristic, designating the ID of the slave station 30-1, to the equalizer controller 130 (405). In response to the switchover request, the equalizer controller 130 searches the parameter table 140 for a set of parameters corresponding to the slave station ID and sets the parameters to the equalizer 112 (410).

Figure 9:
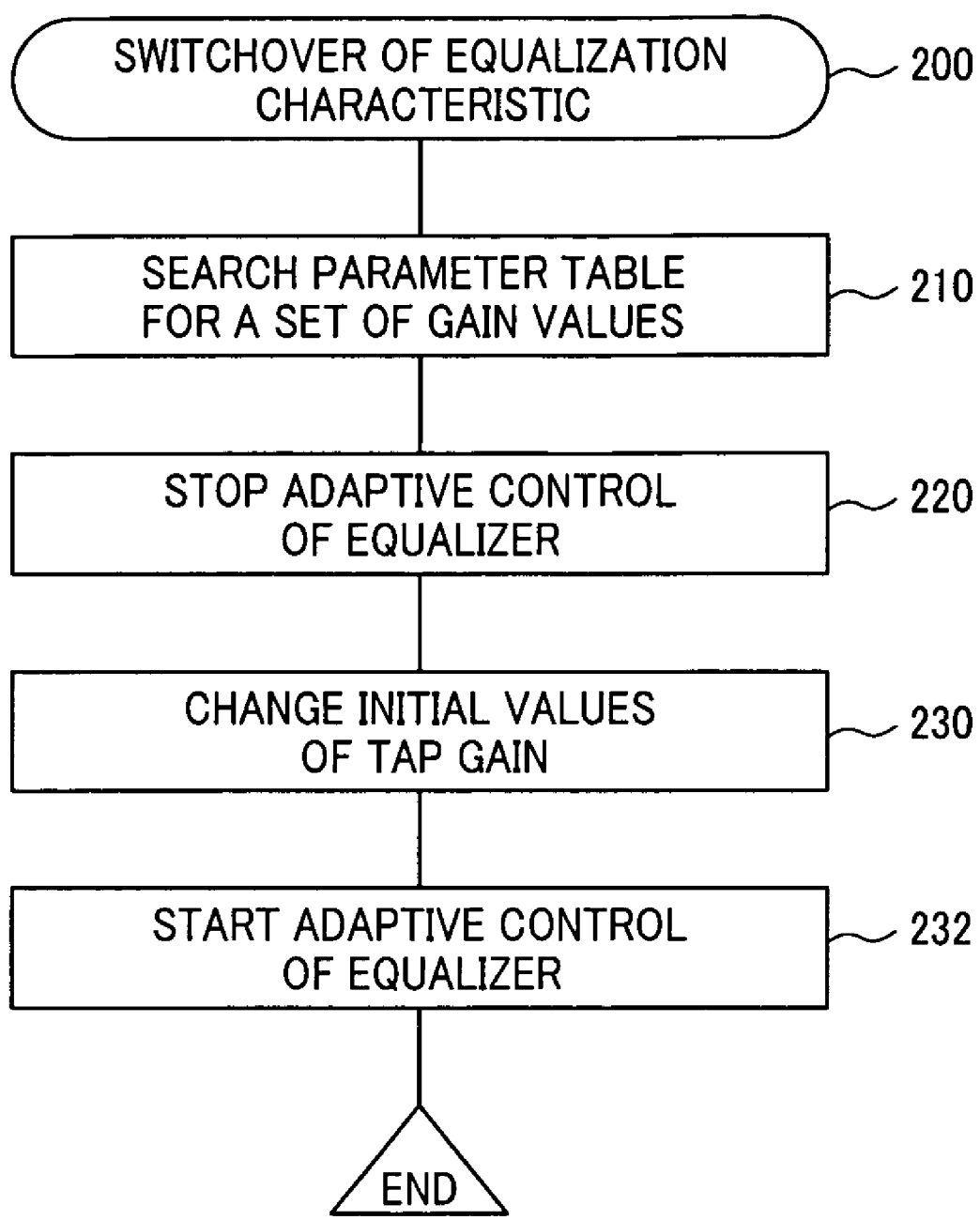
FIG. 9 shows a control flow of equalization characteristic switchover to be executed by an equalizer controller 130 in the first embodiment of the present invention.

FIG. 9 shows a control flow of equalization characteristic switchover to be executed by the equalizer controller 130 in response to the switchover request from the main controller 100 in the first embodiment.

Upon receiving the switchover request for switching the equalization characteristic, the equalizer controller 130 searches the parameter table 140 for an entry (a set of gain values) corresponding to the slave station ID (ID=1 in this example) designated from the main controller 100 (210). The equalizer controller 130 stops the adaptive control operation of the equalizer (220) and changes the initial values of the tap gains (230). Changing the initial values of the tap gains is, in other words, setting the set of gain values (x11, x12, etc.) retrieved from the parameter table 140 to the parameter register 80 shown in FIG. 6. Upon the completion of changing the initial values of the tap gains, the equalizer controller 130 starts the adaptive control operation of the equalizer (232) and waits for another switchover request.

As is evident from equation (2), the main controller 100 issues a switchover request to the equalizer controller 130 at timing T1c, taking account of the transmission delay time tf1 and the internal control delay td, in the first embodiment. Therefore, after the slave station 30-1 starts data transmission at the transmission start time T1s specified from the master station 10, the tap gains of the waveform equalizer 112 can be initialized (411) to the tap gain values fit for the slave station 30-1 immediately before the transmission data arrives at the master station 10. Consequently, transmission signals 420 from the slave station 30-1 are equalized with the characteristic suitable for modifying the waveform distortion occurred along the optical transmission path and supplied to the upstream frame terminating unit 113.

According to the first embodiment, even if upstream data packets with different degrees of waveform distortions depending on the lengths of the optical fibers through which they have passed arrive successively, it becomes possible to equalize their waveforms (compensation of dispersion) quickly by the equalizer 112 at the master station side. Therefore, according to this embodiment, even in a high-speed PON system such as the one having a transmission rate of 10 Gbps, it becomes possible to suppress the influence of dispersion compensation. In a moderate-speed PON system having a transmission rate of the order of 1 Gbps, it becomes possible to apply a laser with a broad spectrum width, for example, a Fabri-Perot laser, to each slave station 30 and the manufacturing cost per slave station can be reduced.

As described above, the slave station 30-1 that wants to transmit data transmits a transmission request packet to the master station 10 before transmitting actual data (401). This transmission request-packet is also transmitted during a transmission grant period assigned to the slave station. Thus, transmission permission requests can be traced back to the ranging process. From the viewpoint of the master station 10, signal propagation delay time for each slave station 30 must be retained in the delay time table 104 to equalize signals from each slave station 30. The master station can obtain signal propagation delay time values for each slave station 30 through the ranging process, as described above.

As noted above, the ranging process is performed before all data communication and signal propagation delay time from the slave stations 30 has not been specified at the time when the ranging process is performed. Therefore, because adaptive control with the equalizer 112 cannot be performed during the ranging process, failure to receive a signal whose waveform distorted by dispersion may occur. To prevent such a transmission error, communication is performed at a low rate (bit rate) of upstream signal transmission during the ranging process so that waveform distortion due to dispersion does not affect the data to be received by the master station. In this case, no problem will occur because the amount of data to be communicated during the ranging process is small.

Second Embodiment

Figure 10:
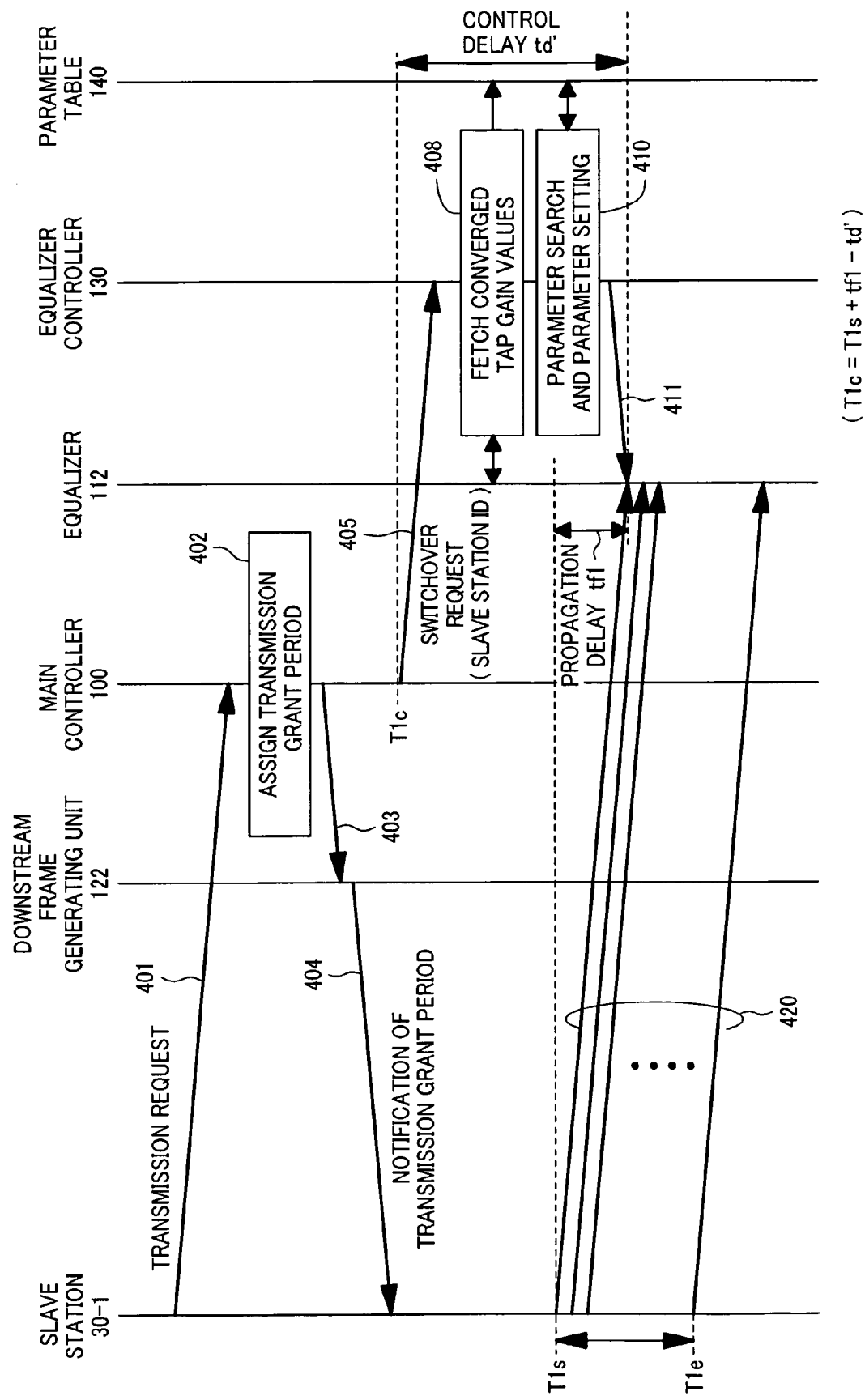
FIG. 10 shows a control sequence of a second embodiment of equalization characteristic switchover.

FIG. 10 shows a control sequence of a second embodiment of equalization characteristic switchover.

A feature of the second embodiment resides in that the equalizer controller 130 searches the parameter table 140 for a set of parameters (tap gain values) for the next slave station after the equalizer controller 130 fetches the converged values of the tap gains from the parameter register 80 provided in the tap gain controller 71A (71B) of the equalizer 112 and stores these values into the parameter table 140 (408), and sets the retrieved parameters to the parameter register 80 (410). In this case, an internal control delay time td, which will be elapsed until new parameters (tap gain values) for the parameter register 80 are set after the equalizer controller 130 receives a switchover request from the main controller 100, is longer than the corresponding delay time td for the first embodiment.

In the second embodiment, the main controller 100 calculates directive timing T1c of the switchover request (405), according to the following equation (3) where td<td":

$$T1c = T1s + tf1 - td''  \quad (3)$$

Figure 11:
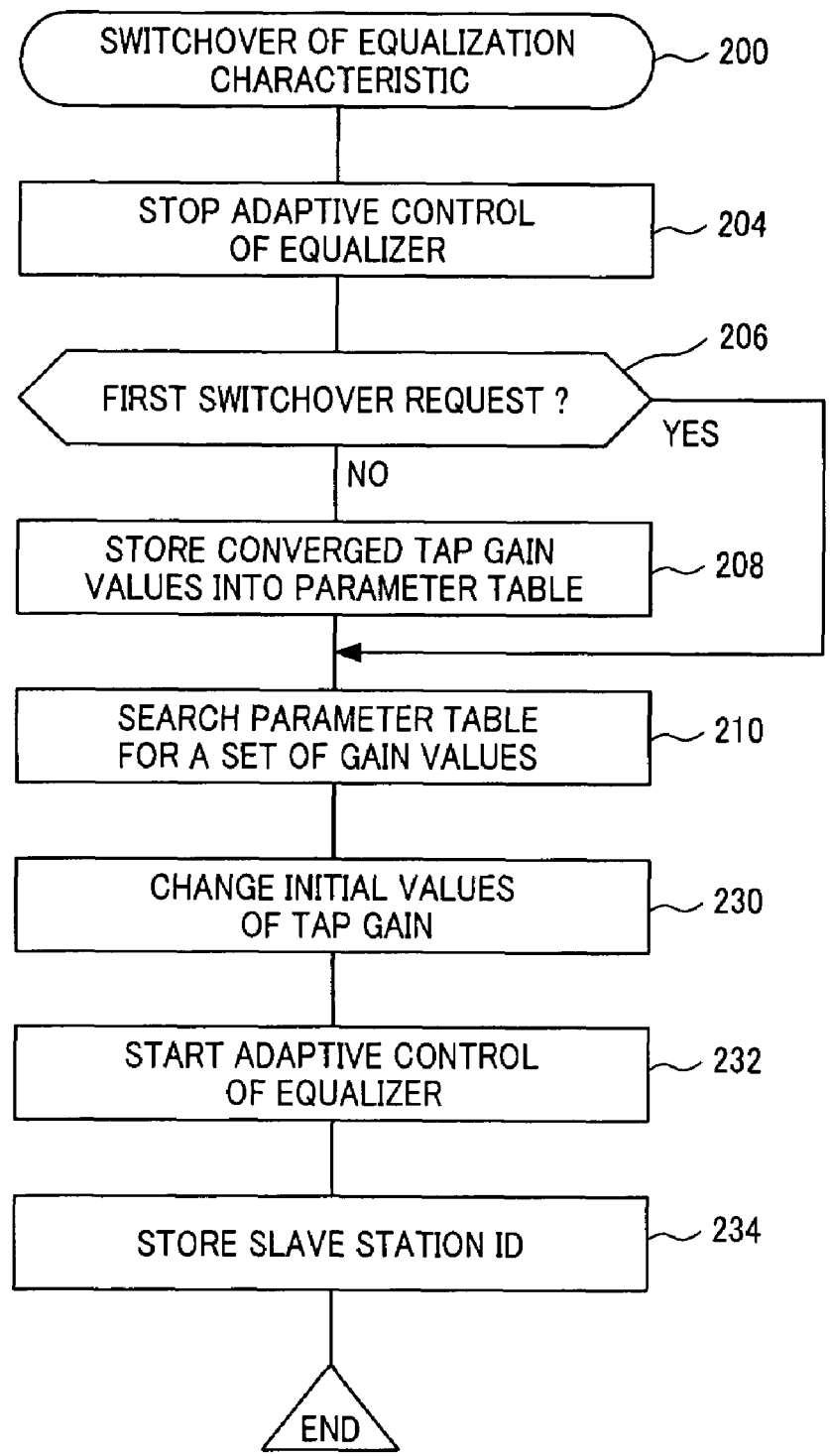
FIG. 11 shows a control flow of equalization characteristic switchover to be executed by the equalizer controller 130 in the second embodiment of the present invention.

FIG. 11 shows a control flow of equalization characteristic switchover to be executed by the equalizer controller 130 in response to the switchover request from the main controller 100 in the second embodiment.

Upon receiving the switchover request for switching the equalization characteristic, the equalizer controller 130 stops the adaptive control operation of the equalizer (204) and determines whether the switchover request received this time is the first one from the main control unit 100 (206). If the switchover request received this time is the first one, the equalizer controller 130 judges that the parameter register 80 does not hold the converged tap gain values fit for a particular slave station, and searches the parameter table 140 for an entry (a set of gain values) corresponding to the slave station ID (ID=1 in this example) (210). After changing the initial values of the tap gains of the equalizer (230), the equalizer controller 130 starts the adaptive control operation of the equalizer (232). Then, the equalizer controller 130 stores the slave station ID as an ID for which the converged values are to be fetched next time from the parameter register (234) and waits for another switchover request.

If the switchover request received this time is not the first one, the equalizer controller 130 fetches the converged tap gain values from the parameter register 80 and stores these values into a parameter table entry specified with the slave station ID which was last stored at step 234 as the one for which the register values are to be fetched next time (208). The equalizer controller 130 then executes the above steps 210 to 234 and waits for another switchover request.

According to the second embodiment, the last results of adaptive control (converged values of the tap gains) actually performed by the equalizer according to received signals from each slave station are stored in the parameter table 140. Consequently, when next transmission data is received from the same slave station, it become possible to restart the adaptive control of the equalizer 112 in an optimum state to correct the wave form distortion of received signals by initially setting the last converged tap gain values to the parameter register 80.

Third Embodiment

Figure 12:
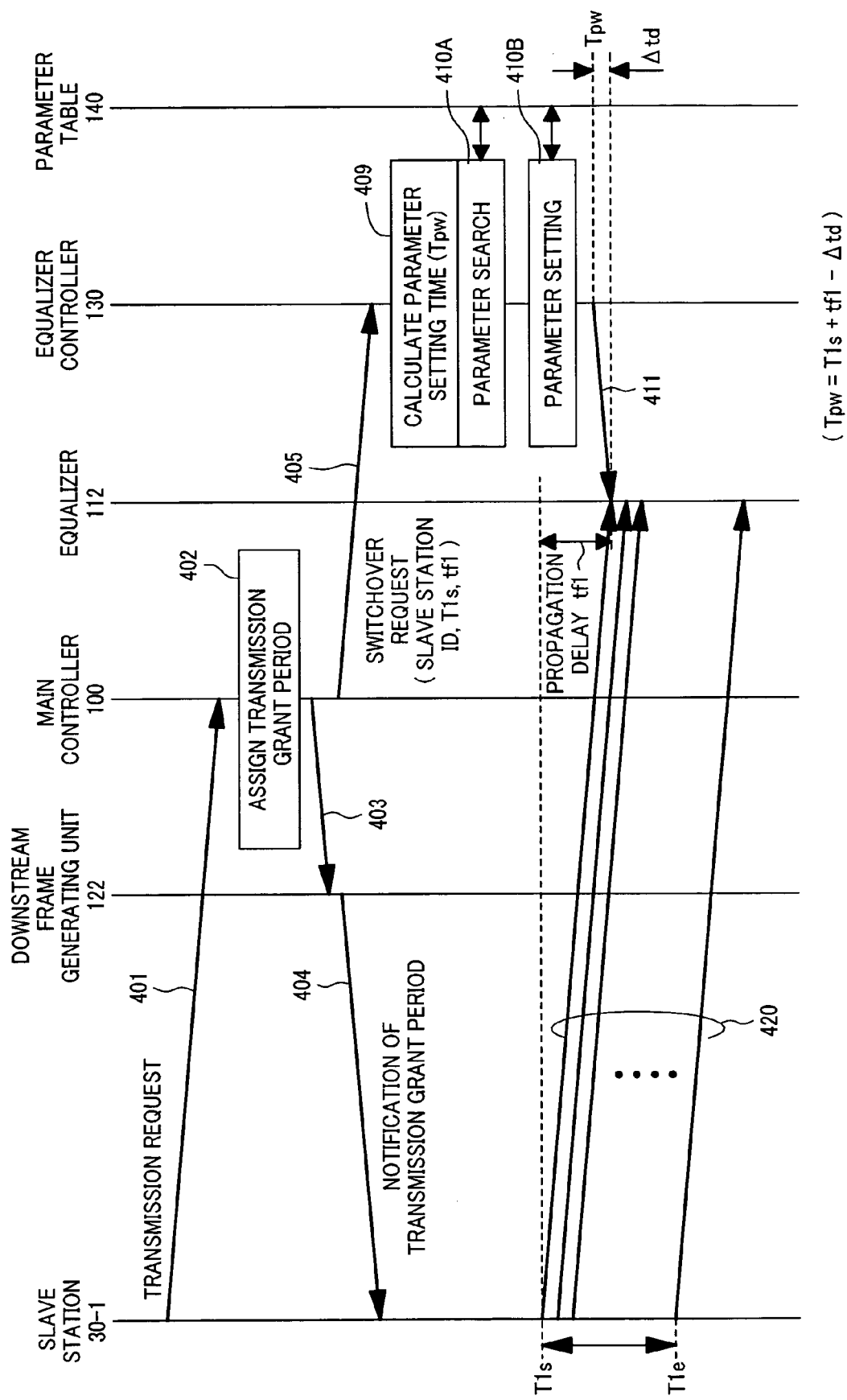
FIG. 12 shows a control sequence of a third embodiment of equalization characteristic switchover.

FIG. 12 shows a control sequence of a third embodiment of switching the equalization characteristic.

A feature of the third embodiment resides in that the main control unit 100 issues a switchover request 405 for switching the equalization characteristic to the equalizer controller 130 at once without calculating the directive timing T1C, after the main control unit 100 notifies the requester slave station of a transmission grant period, and the equalizer controller 130 determines the timing to set parameters to the parameter register 80. In this case, the main controller 100 designates information required for the equalizer controller 130 to determine the timing to set parameters by the switchover request 405.

In this embodiment, the switchover request 405 includes the transmission start time T1s assigned to the slave station by the master station and the transmission delay time tf1 of signals transmitted from the slave station in addition to the slave station ID. Upon receiving the switchover request 405, the equalizer controller 130 calculates the time "Tpw" to set parameters (409), searches the parameter table 140 for a set of tap gain values corresponding to the slave station ID designated by the master station (410A), and sets the parameters (the set of tap gain values) to the parameter register 80 when the parameter setting time Tpw comes (410B). In calculating the parameter setting time Tpw, a control delay time Δtd until the equalizer starts the adaptive control operation after the equalizer controller 130 starts to set the parameters is taken into account.

Figure 13:
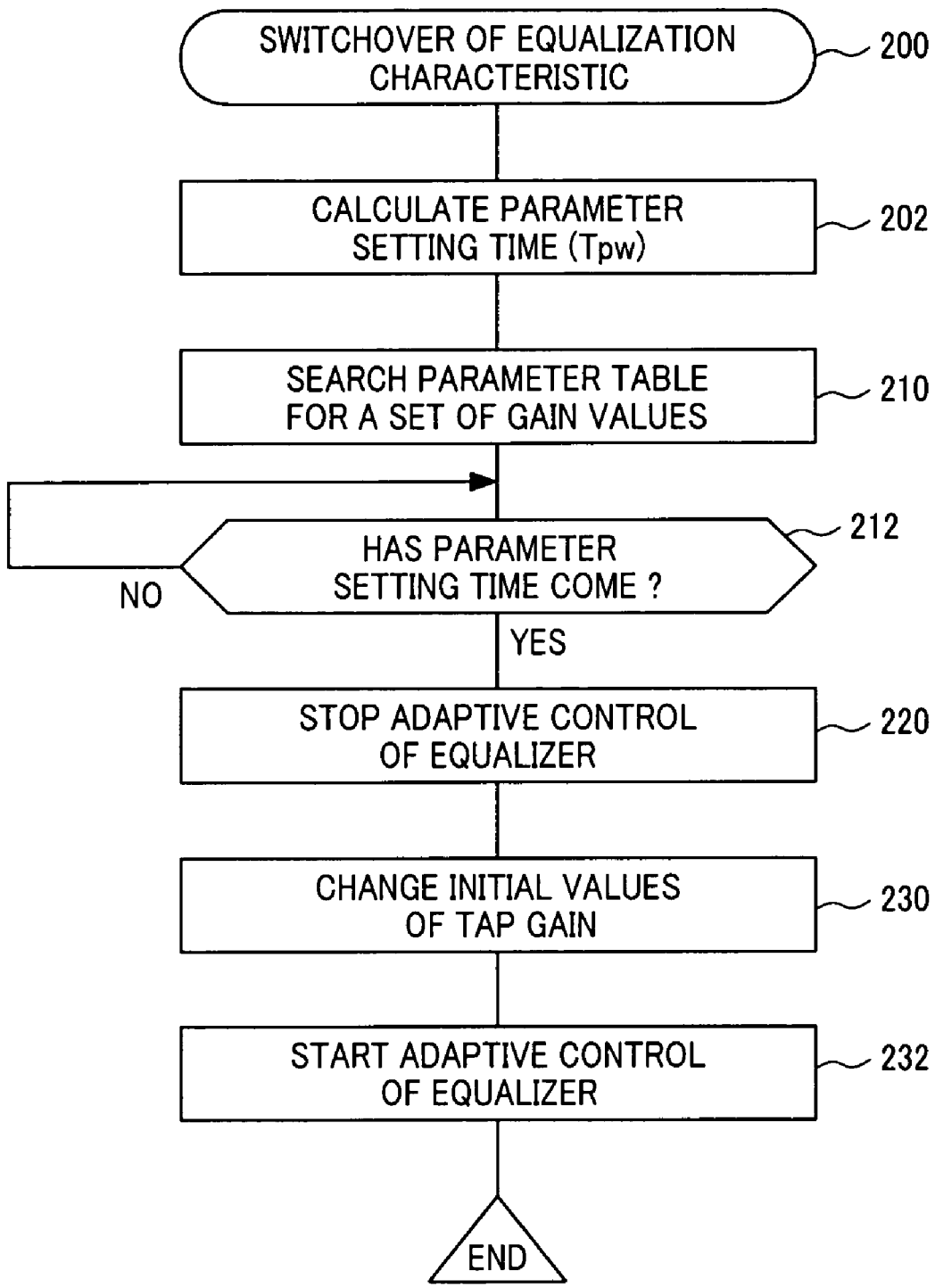
FIG. 13 shows a control flow of equalization characteristic switchover to be executed by the equalizer controller 130 in the third embodiment of the present invention.

FIG. 13 shows a control flow of equalization characteristic switchover to be executed by the equalizer controller 130 in response to the switchover request from the main controller 100 in the third embodiment.

Upon receiving the switchover request for switching the equalization characteristic, the equalizer controller 130 calculates the time Tpw to set parameters, that is the time to switch the equalization characteristic (202) based on the transmission start time T1s and the transmission delay time tf1 for the slave station 30-1 designated in the switchover request, and the control delay time Δtd known beforehand, according to the following equation (4):

$$Tpw = T1s + tf1 - \Delta td \quad (4)$$

Then, the equalizer controller 130 searches the parameter table 140 for an entry (a set of gain values) corresponding to the station ID (ID=1 in this example) (210) and waits until the parameter setting time Tpw has come (212). When the parameter setting time Tpw has come, the equalizer controller 130 stops the adaptive control operation of the equalizer (220), changes the initial values of the tap gains (230), and starts the adaptive control operation of the equalizer (232).

According to the third embodiment, the load on the main controller 100 is reduced owing to that the parameter setting time Tpw is calculated by the equalizer controller 130 and the same effect as the first embodiment can be achieved.

Fourth Embodiment

Figure 14:
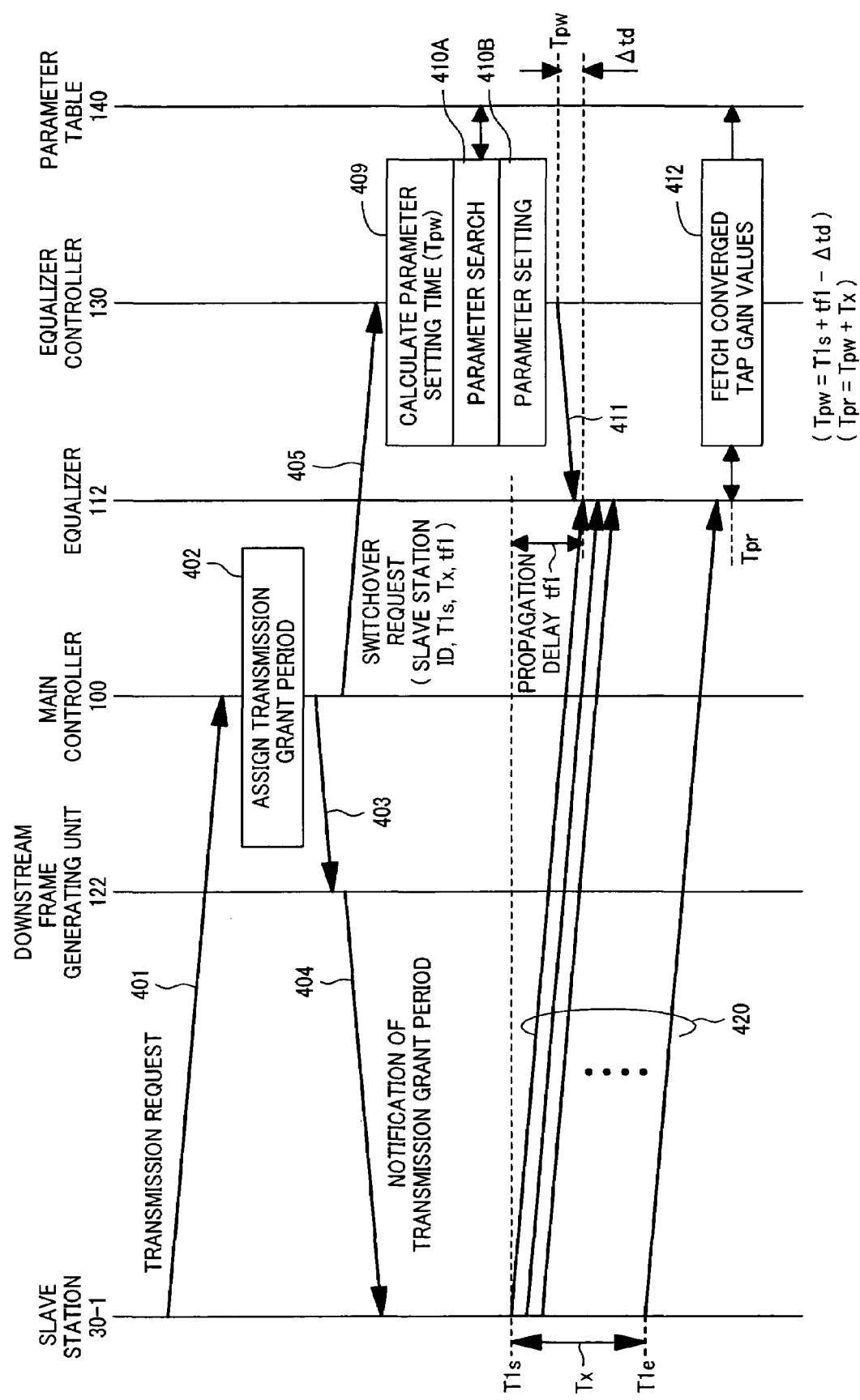
FIG. 14 shows a control sequence of a fourth embodiment of equalization characteristic switchover.

FIG. 14 shows a control sequence of a fourth embodiment of equalization characteristic switchover.

A feature of the fourth embodiment resides in that the equalizer controller 130 calculates the time Tpw to set parameter (408) to the parameter register 80 and sets the parameters (a set of tap gain values) (410B) to the parameter register 80, as is the case for the third embodiment. The equalizer controller 130 fetches the converged value of the tap gains from the parameter register 80 (412) at timing when data transmission (420) from the slave station has been completed.

In this embodiment, the switchover request 405 includes the transmission start time T1s and the transmission period Tx assigned to the slave station by the master station, and the transmission delay time tf1 of signals transmitted from the slave station in addition to the slave station ID.

Figure 15:
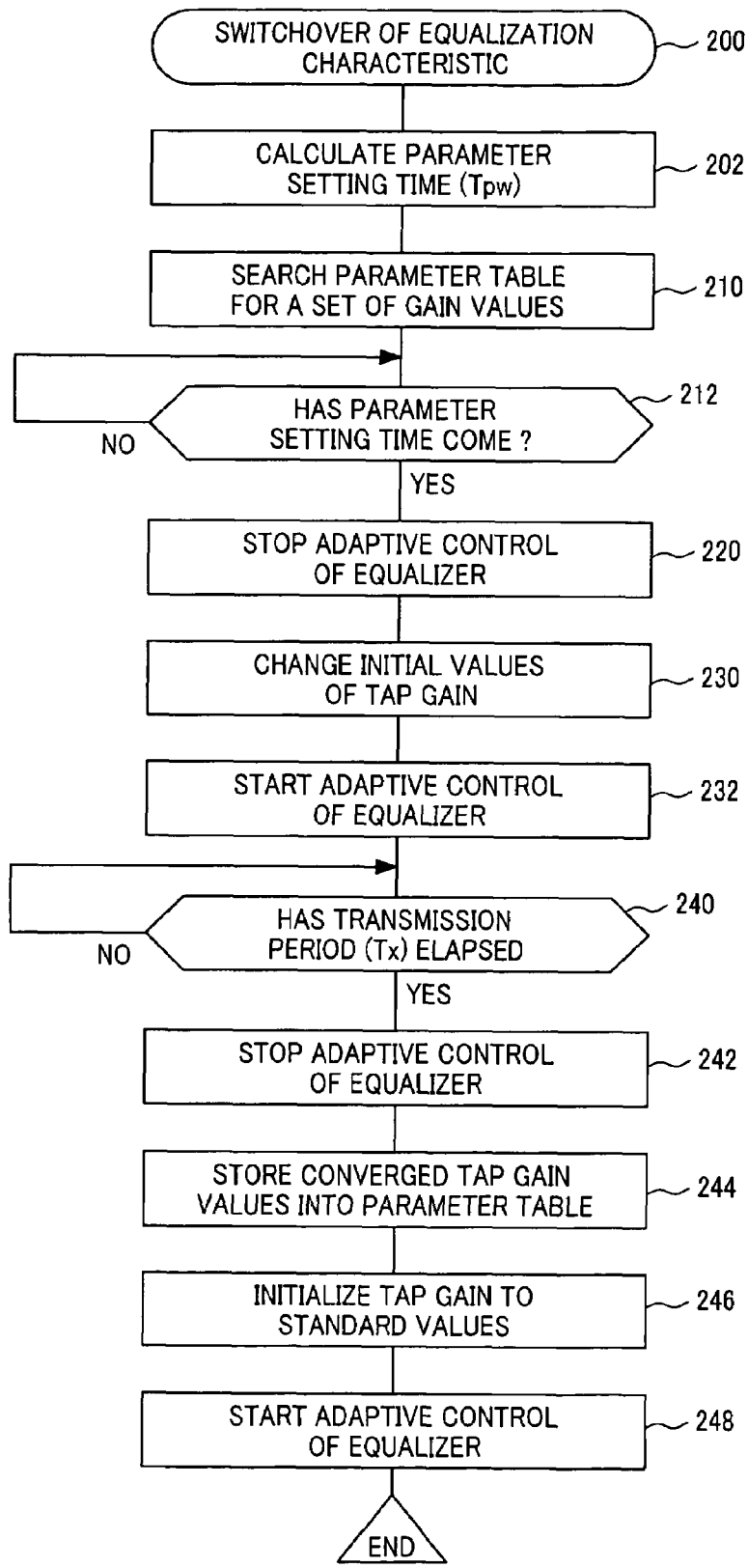
FIG. 15 shows a control flow of equalization characteristic switchover to be executed by the equalizer controller 130 in the fourth embodiment of the present invention.

FIG. 15 shows a control flow of equalization characteristic switchover to be executed by the equalizer controller 130 in response to the switchover request from the main controller 100 in the fourth embodiment. Steps 202 to 232 are the same as the control flow for the third embodiment described for FIG. 13.

In the fourth embodiment, after starting the adaptive control operation of the equalizer (232), the equalizer controller 130 waits until the transmission period Tx has elapsed (240). When the transmission period Tx has elapsed, the equalizer controller 130 stops the adaptive control operation of the equalizer (242), fetches the converged value of the tap gains from the parameter register 80, and stores these values into the parameter table entry corresponding to the slave station ID (244). After that, the equalizer controller 130 initializes the tap gains to standard values (default values) (246), starts the adaptive control operation of the equalizer (248), and waits for another switchover request.

According to this embodiment, the load on the main controller 100 is reduced owing to that the parameter setting time Tpw is calculated by the equalizer controller 130 and the same effect as the first embodiment can be achieved. In similar to the case for the second embodiment, when next transmission data is received from the same slave station, it become possible to restart the adaptive control of the equalizer 112 from an optimum state to correct the signal waveform distortion by setting the last converged tap gain values as initial parameters to the parameter register 80.

Although the equalizer controller 130 waits until the transmission period Tx has elapsed after the start of the adaptive control operation of the equalizer in the flowchart of FIG. 15, the equalizer controller 130 may calculate the time to fetch the converged tap gain values Tpr as well in accordance with the following equation (5) when calculating the parameter setting time Tpw (202), and fetch the converged tap gain values from the parameter register 80 when the fetching time Tpr has come, and stores these values into the parameter table 140.

$$Tpr = Tpw + Tx - \Delta td \quad (5)$$

Alternatively, the master station may designate transmission end time T1e instead of transmission period Tx in the switchover request 405 and the equalizer controller 130 may calculate the time to fetch the converged tap gain values Tpr in accordance with the following equation (6) when calculating the parameter setting time Tpw (202).

$$Tpr = T1e + tf1 \quad (6)$$

The foregoing embodiments have been described assuming that the LMS method is used as the algorithm for calculating tap gain values. However, the present invention is effective, even when another calculation algorithm is used, for example, a Recursive Least Square (RLS) method. Since inverse matrix calculation is required in the RLS method, the size of the equalizer 112 becomes larger. However, the LMS method can improve the conversion calculation speed higher than the LS method. The present invention is also effective, even when a Kalman gain matrix is used as the calculation algorithm for tap gain values. The present invention is effective, even when multi-mode fibers are used as the optical fiber 50 and branch optical fibers 51, instead of signal mode fibers.

What is claimed is:

1. An optical access network system where a central office side apparatus and a plurality of subscriber connection apparatuses connected to subscriber terminals are connected through a Passive Optical Network (PON), each subscriber connection apparatus transmitting data during a transmission grant period assigned from said central office side apparatus, said central office side apparatus comprising:
   a main controller to notify each subscriber connection apparatus of a transmission grant period;
   an equalizer of a tap gain adaptive control type to correct waveform distortions of signals received from the subscriber connection apparatuses;
   an equalizer controller for setting initial values of tap gains to said equalizer; and
   a parameter table for storing the initial values of the tap gains to be set to said equalizer, in association with identifiers of said subscriber connection apparatuses;
   wherein said main controller issues a switchover request for switching an equalization characteristic to said equalizer controller, designating the identifier of a subscriber connection apparatus each time notifying the subscriber connection apparatus of a transmission grant period, and
   said equalizer controller retrieves, in response to said switchover request, the initial values of the tap gains corresponding to the designated identifier from said parameter table and sets the initial values of the tap gains to said equalizer.

2. The optical access network system according to claim 1, wherein said main controller issues said switchover request for switching the equalization characteristic at a specific timing determined based on a start time of said transmission grant period, a delay time of signal transmission on a transmission path from said subscriber connection apparatus to said central office side apparatus, and a control delay time in switching the equalization characteristic by said equalizer controller.

3. The optical access network system according to claim 2, wherein said equalizer controller sets the initial values of the tap gains to said equalizer after fetching present values of the tap gains from said equalizer in response to the switchover request from said main controller and storing these values into said parameter table as new initial values of the tap gains in association with the identifier of the subscriber connection apparatus that has completed data transmission.

4. The optical access network system according to claim 3, wherein
   said equalizer comprises:
   a filter unit including a plurality of variable gain amplifiers for receiving, as optical-to-electrical converted tap signals with different delays, a signal received from said subscriber connection apparatus;
   a discriminator for discriminating a signal output from the filter unit; and a tap gain controller for performing gain adaptive control of each of said variable gain amplifiers according to a difference between input and output signals of said discriminator and said tap signals input to the variable gain amplifiers, said tap gain controller includes a parameter register for setting the initial values of tap gains given from said equalizer controller to said variable gain amplifiers as initial values;

said parameter register holds, during operation of said tap gain controller, latest gain values of said amplifiers under adaptive control instead of said initial values, and said equalizer controller fetches the present values of the tap gains from said parameter register.

5. The optical access network system according to claim 1, wherein said switchover request for switching the equalization characteristic includes a start time of said transmission grant period and a signal transmission delay time on a transmission path from said subscriber connection apparatus to said central office side apparatus, and said equalizer controller determines a timing to switch the tap gains of the equalizer based on the start time and the transmission delay time specified in the switchover request, and sets the initial values of the tap gains to said equalizer at that timing.

6. The optical access network system according to claim 1, wherein said equalizer controller sets the initial values of the tap gains to said equalizer after fetching present values of the tap gains from said equalizer in response to the switchover request from said main controller and storing these values into said parameter table as new initial values of the tap gains in association with the identifier of the subscriber connection apparatus that has completed data transmission.

7. The optical access network system according to claim 6, wherein said equalizer comprises:

a filter unit including a plurality of variable gain amplifiers for receiving, as optical-to-electrical converted tap signals with different delays, a signal received from said subscriber connection apparatus;

a discriminator for discriminating a signal output from the filter unit; and a tap gain controller for performing adaptive gain control of each of said variable gain amplifiers according to a difference between input and output signals of said discriminator and said tap signals input to the variable gain amplifiers, said tap gain controller includes a parameter register for setting the initial values of tap gains given from said equalizer controller to said variable gain amplifiers as initial values, said parameter register holds, during operation of said tap gain controller, latest gain values of said amplifiers under adaptive control instead of said initial values, and said equalizer controller fetches the present values of the tap gains from said parameter register.

8. The optical access network system according to claim 1, wherein said switchover request for switching the equalization characteristic includes a start time of the transmission grant period, a transmission period, and a signal transmission delay time on a transmission path from said subscriber connection apparatus to said central office side apparatus, and said equalizer controller determines a timing to switch the tap gains of the equalizer based on the start time and the transmission delay time specified in the switchover request, sets the initial values of the tap gains to said equalizer at that timing, and fetches present values of the tap gains from said equalizer after the transmission period specified in the switchover request has elapsed, and stores these values into said parameter table as new initial values of the tap gains in association with the identifier of the subscriber connection apparatus that has completed data transmission.

9. The optical access network system according to claim 1, wherein said switchover request for switching the equalization characteristic includes a start time and an end time of said transmission grant period and a signal transmission delay time on a transmission path from said subscriber connection apparatus to said central office side apparatus, and said equalizer controller determines a timing to switch the tap gains of the equalizer based on the start time and the transmission delay time specified in the switchover request, sets the initial values of the tap gains to said equalizer at that timing, fetches present values of the tap gains from said equalizer at a specific timing determined by the end time of transmission grant period and the transmission delay time specified in the switchover request, and stores these values into said parameter table as new initial values of the tap gains in association with the identifier of the subscriber connection apparatus that has completed data transmission.

10. The optical access network system according to claim 1, wherein said equalizer comprises:

a filter unit including a plurality of variable gain amplifiers for receiving, as optical-to-electrical converted tap signals with different delays, a signal received from said subscriber connection apparatus;

a discriminator for discriminating a signal output from the filter unit; and a tap gain controller for performing adaptive gain control of each of said variable gain amplifiers according to a difference between input and output signals of said discriminator and tap signals input to the variable gain amplifier, and said tap gain controller includes a parameter register for setting the initial values of tap gains given from said equalizer controller to said amplifiers as initial values.

11. The optical access network system according to claim 10, wherein said filter unit comprises:

a delay circuit comprising a plurality of delay elements connected in multiple stages for outputting a received signal as said tap signals with different delays; and an adder for adding the outputs of said plurality of variable gain amplifiers to produce an output signal of said filter.

12. The optical access network system according to claim 1, wherein said equalizer comprises:

a first filter unit including a plurality of variable gain amplifiers for receiving, as optical-to-electrical converted tap signals with different delays, a signal received from said subscriber connection apparatus;

a discriminator for discriminating a signal output from the first filter unit;

a first tap gain controller for performing adaptive gain control of each of said variable gain amplifiers according to a difference between input and output signals of said discriminator and tap signals input to the variable gain amplifiers;

a second filter unit including a plurality of variable gain amplifiers for receiving an output signal of said discriminator as tap signals with different delays; and a second tap gain controller for performing adaptive gain control of each of the variable gain amplifiers of the second filter according to a difference between input and output signals of said discriminator and tap signals input to the variable gain amplifiers, an output signal of said second filter unit and an output signal of said first filter unit being added and input to said discriminator, and said first and second tap gain controllers including parameter registers for setting the initial values of tap gains given from said equalizer controller to the amplifiers of said first and second filters, respectively, as initial values.

* * * * *